United States Patent [19]

Lyon et al.

[11] 4,035,270

[45] July 12, 1977

[54] ISOTOPE SEPARATION PROCESS

[75] Inventors: Richard K. Lyon, Fanwood; Andrew Kaldor, Berkeley Heights, both of N.J.

[73] Assignee: Exxon Research and Engineering Company, Linden, N.J.

[21] Appl. No.: 570,877

[22] Filed: Apr. 23, 1975

[51] Int. Cl.² .............................................. B01J 1/10
[52] U.S. Cl. .................. 204/157.1 R; 204/DIG. 11
[58] Field of Search .............. 204/157.1 R, DIG. 11

[56] References Cited

U.S. PATENT DOCUMENTS 3,443,087  5/1969  Robieux et al. ............ 204/DIG. 11

FOREIGN PATENT DOCUMENTS 1,284,620  8/1972  United Kingdom ........ 204/DIG. 11

*Primary Examiner*—Howard S. Williams
*Attorney, Agent, or Firm*—Robert J. Baran

[57] ABSTRACT

The instant invention relates to a process for separating a material into two or more parts in each of which the abundances of the isotopes of a given element differ from the abundances of the isotopes of the same material in said material. More particularly, the invention relates to a method for the isotopically selective excitation of gas phase $UF_6$ by infrared photon absorption followed by selective reaction of said excited $UF_6$ with atomic chlorine, bromine, or iodine to form a product which may be separated by means known in the art.

4 Claims, No Drawings

ISOTOPE SEPARATION PROCESS

CROSS REFERENCE TO RELATED APPLICATION

This application is related to copending application, U.S. Ser. No. 408,669, filed on Oct. 23, 1973, in the name of R. K. Lyon and the CIP thereof, filed on the same day herewith. This application, like U.S. Ser. No. 408,669 and the CIP thereof, is related to isotope separation processes wherein, in a first step, IR radiation is utilized to selectively excite one isotope of an isotopic mixture, and said excited isotope is converted, in a second step, to a form which can be recovered from said mixture. This application differs from U.S. Ser. No. 408,699, however, in that it is not limited to sequential multiple infrared absorption to provide a selective separation of $U^{235}F_6$ from admixture with $U^{238}F_6$, and additionally the instant invention utilizes chemical reaction of said selectively excited isotope to convert same into a recoverable form. This application differs from the CIP application in that, again, it is not limited to sequential multiple infrared photon absorption in the selective excitation step, and claims a preferred method of chemical reaction, e.g., reaction with atomic chlorine, bromine, or iodine, for the conversion of selectively excited $UF_6$ to a recoverable form. Both U.S. Ser. No. 408,669 and the CIP thereof are hereby incorporated by reference.

FIELD OF THE INVENTION

The instant invention relates to a process for separating a material into two or more parts in each of which the abundances of the isotopes of a given element differ from the abundances of the isotopes of the same material in said material. More particularly, the invention relates to a method for the isotopically selective excitation of gas phase $UF_6$ by infrared photon absorption followed by selective reaction of said excited $UF_6$ with atomic chlorine, bromine, or iodine to form a product which may be separated by means known in the art.

BACKGROUND OF THE PRIOR ART

In order that the instant invention may be clearly understood, it is useful to review the prior art relating to photochemical isotope separation. U.S. Pat. No. 2,713,025 and British Pat. No. 1,237,474 are good examples of processes for the photochemical separation of the isotopes of mercury. The first requirement for a photochemical isotope separation is that one finds conditions such that atoms or molecules of one isotope of a given element absorb light more strongly than do atoms or molecules of another isotope of said element. Mercury is a volatile metal and readily forms a vapor of atoms. Said atoms absorb ultraviolet light at 2537 A. The absorption line of $Hg^{202}$ is displaced by about 0.01 A with respect to the absorption line of $Hg^{200}$. Since the absorption lines are extremely narrow, one may by use of a light in a critically narrow wavelength region excite either $Hg^{200}$ or $Hg^{202}$.

The second requirement for a photochemical isotope separation is that those atoms or molecules which are excited by light undergo some process which the atoms or molecules which have not been excited do not undergo, or at least do not undergo as rapidly. A quantum of 2537 A ultraviolet light imparts an excitation of 112.7 Kcal/mole to the mercury atom which absorbs it. The number of mercury atoms which at room temperature are thermally excited to this energy is vanishingly small, hence the atoms excited by light are not diluted by atoms excited by thermal means. Atoms of this high excitation readily undergo reactions with $H_2O$ (as taught in the U.S. patent) or with $O_2$, HCl or butadiene (as taught in the British patent), said reactions not occurring at room temperature with unexcited mercury.

Uranium, however, is a highly refractory metal, boiling only at extremely high temperatures. Thus, use of the above-described process with uranium atoms instead of mercury involves obvious difficulties. The most volatile form of uranium is $UF_6$. $U^{235}F_6$ and $U^{238}F_6$ both absorb ultraviolet light and do so to exactly the same extent at all wavelengths in the UV; hence, UV excitation of $UF_6$ does not satisfy the first requirement of photochemical isotope separation. However, $UF_6$ will also absorb infrared light in the region around 626 $cm^{-1}$ (the $V_3$ band) and 189 $cm^{-1}$ (the $V_4$ band. Both the $V_3$ and $V_4$ bands of $U^{235}F_6$ are shifted slightly toward higher energy with respect to the $V_3$ and $V_4$ bands of $U^{238}F_6$ respectively, but the size of these shifts is small compared to the width of the bands; in other words, the infrared absorption spectra of $U^{238}F_6$ and $U^{235}F_6$ do not exactly coincide, but they overlap at all wavelengths so that if one isotope absorbs light, so, to a substantial degree, will the other. Hence, the infrared excitation of $UF_6$ by absorption of a single IR photon is a process of limited isotopic selectivity.

The second requirement for isotope separation is also a matter of some difficulty for $UF_6$. $UF_6$ molecules which are excited by IR light are no different from molecules which have been excited to the same energy level thermally. Most processes the photoexcited molecules will undergo, those molecules which are thermally excited to the same energy level will also undergo. This dilution of the photoexcited molecules with thermally excited molecules will further decrease the isotopic separation factor.

The instant invention is a three-step process, the first step being that the $UF_6$ molecules to be isotopically separated are irradiated with a powerful infrared laser for a time of less than $10^{-3}$ seconds under conditions such that at least 0.1% of the $U^{235}F_6$ molecules being irradiated absorb an energy of more than 2000 $cm^{-1}$. This may be done by use of the process of sequential multiple photon absorption, i.e. if $UF_6$ is irradiated at a power density greater than $10^4$ watts per $cm^2$ per torr pressure of $UF_6$ in the presence of a second gas, said second gas having a partial pressure of at least 5 times the partial pressure of the $UF_6$, then the $UF_6$ may be sequentially excited from the ground vibrational state to the first excited vibrational state to the second excited vibrational state to the third excited vibrational state to the fourth excited vibrational state, etc., the isotopic selectivity of each excitation step being compounded as the sequential excitation proceeds.

The second step of the instant invention is the reaction of said excited $UF_6$ with a gaseous reagent to produce a product which is recovered in the third step by means known in the art. The ratio of said gaseous reagent to $UF_6$ must be at least 0.1. The total time in which the $UF_6$ is in contact with said gaseous reactant, both before irradiation by the IR laser and after said irradiation, is less than $10^{-3}$ seconds. Said gaseous reagent is chosen from the group consisting of atomic chlorine, bromine, and iodine.

The reasons for the above requirements and the preference for atomic chlorine, bromine, and iodine are complex and are related to the problem of the thermal dilution. As indicated above, $UF_6$ molecules which are excited in an isotopically selective manner by the IR laser will be diluted with $UF_6$ molecules thermally excited to the same energy levels. It is the teaching of the instant invention that this undesirable dilution effect is to be minimized by rapidly exciting a significant fraction (more than 0.1%) of either the $U^{235}F_6$ or $U^{238}F_6$. Once the photoexcited $UF_6$ molecules are formed, they will be removed by reaction with the atomic chlorine, bromine, or iodine and they will be removed by deexcitation processes. The thermally excited $UF_6$ molecules will also be removed by reaction and deexcitation but new thermally excited $UF_6$ molecules will be continually formed from unexcited $UF_6$ molecules. Thus, after irradiation by the IR laser the ratio of photoexcited $UF_6$ molecules to thermally excited $UF_6$ molecules will continually decrease and the undesirable dilution effect continually increase. Under most conditions, the lifetime of the photoexcited $UF_6$ will be $10^{-3}$ seconds or less and it is the teaching of the instant invention that both the irradiation time and contact time be less than $10^{-3}$ seconds in order to minimize the dilution effect.

Since this very limited time is available for reaction between the photoexcited $UF_6$ and the gaseous reagent, it is necessary to use said gaseous reagent in considerable excess over the photoexcited $UF_6$ in order to achieve an acceptably efficient recovery of the latter. Hence, the instant invention teaches that the ratio of gaseous reagent to total $UF_6$ must be at least 0.1.

The use of atomic chlorine, bromine, or iodine as the reagent with which the photoexcited $UF_6$ reacts is advantageous for three reasons. First, there is a general advantage of atomic over molecular reagents. It is well known that when a vibrationally excited molecule collides with an unexcited molecule the excitation may be transferred leaving the former molecule unexcited and the latter molecule excited. This process is called V—V transfer and it can be an extremely efficient process. If one attempted to react the photoexcited $UF_6$ with a molecular reagent, V—V transfer could result in the rapid loss of the photoexcited $UF_6$. The use of an atomic reagent which cannot undergo V—V transfer avoids this danger.

Second, within the group of atomic reagents atomic chlorine, bromine, and iodine have the advantage of being readily generated in situ by photolysis, pyrolysis and other means known in the art.

Third, atomic chlorine, bromine, and iodine are well known to undergo a rapid recombination to form molecular halogens. Thus, they are self scavenging reagents, i.e. they may be used in excess over that which will react with the photoexcited $UF_6$ and the unused excess will react with itself to form the relatively inert molecular halogen. By suitable adjustment of the reaction conditions, generation and substantial removal of atomic chlorine, bromine, or iodine may be achieved within the required contact time of $10^{-3}$ seconds.

From the above description, the instant invention is readily distinguished from the prior art. Thus, U.S. Pat. No. 3,443,087 teaches the separation of $U^{235}F_6$ from $U^{238}F_6$ by selectively exciting one of them with an infrared laser then ionizing said excited molecules with ultraviolet light and recovering the ions by means of electric and/or magnetic fields or chemical reactions. In a review entitled "Photochemical Isotope Separation As Applied to Uranium" (Union Carbide Corporation Nuclear Division, Oak Ridge Gaseous Diffusion Plant, Mar. 15, 1972, K-L-3054, Revision 1, page 29), Farrar and Smith discuss the above-mentioned patent and comment unfavorably on the practicality of the proposed second step of photoionization. As an alternative, they suggest photodissociation.

British Pat. No. 1,284,620, German Pat. No. 1,959,767 and German Pat. No. 2,150,232 teach the use of infrared radiation to selectively excite molecules which then undergo a chemical reaction which the unexcited molecules undergo more slowly. Only one example of such a reaction is given, the thermal decomposition of $U(BH_4)_4$.

In all the above references the energy given the molecules in the photoexcitation step is explicitly taught to be that of one IR photon, which for $UF_6$ is less than the excitation of at least 2000 $cm^{-1}$ taught in the instant invention. None of the above references teach, show, or suggest the advantage of exciting a substantial fraction of either the $U^{235}F_6$ or the $U^{238}F_6$ and thereby reducing thermal dilution, nor do they teach, show or suggest the need for very short irradiation time and very short contact time, nor do they teach, show, or suggest the need to use an excess of gaseous reagent to efficiently recover the photoexcited $UF_6$, nor do they teach, show, or suggest the advantages of using atomic chlorine, bromine, or iodine as the said gaseous reagent.

PREFERRED EMBODIMENT

Uranium ore of natural isotopic distribution is converted to $UF_6$ vapor by means well known in the art. Said $UF_6$ is contacted with atomic iodine or with an atomic iodine-inert gas mixture in a photolytic cell and is irradiated with an infrared laser at an IR frequency of 625 to 645 $cm^{-1}$ or 189 to 204 $cm^{-1}$, at a power density of at least $10^4$ watts per $cm^2$ per torr pressure of $UF_6$, at an energy density of $10^{-3}$ to $10^{+3}$ joules per $cm^2$, for an irradiation time of $10^{-10}$ to $5 \times 10^{-5}$ seconds, said atomic iodine having a partial pressure of 0.1 to 100 times the partial pressure of the $UF_6$, said inert gas having a partial pressure large enough so that the sum of the partial pressure of inert gas and of atomic iodine is 5 to 10,000 times the partial pressure of the $UF_6$, said contacting being done at a temperature less than 600°K, the time during which $UF_6$ is in contact with atomic iodine at said temperature being less than $100^{-3}$ seconds and the partial pressure of $UF_6$ being $10^{-4}$ to 100 torr. Under above conditions, the reaction of $UF_6$ and I occurs with isotopic selectivity and reaction product may be recovered by any of the means known in the art.

The photolytic cell may be operated as either a batch or continuous reactor. In the former case, the gas mixture in the reactor is subjected to enough laser pulses to produce the desired degree of conversion of the $UF_6$, then the unconverted $UF_6$ which is depleted in $U^{235}$ and the product of the selectively excited isotope and the gaseous reagent which is enriched in $U^{235}$ are recovered by any of the means well known in the art. Should a higher degree of enrichment be desired, then by means well known in the art the reaction product may be converted to $UF_6$ and the process of the instant invention repeated. Likewise, if the undecomposed $UF_6$ is not depleted to the desired level, further depletion may be achieved by repeating the process of the instant invention. The techniques of staging isotopic separation so as to achieve desired levels of enrichment in the product and depletion in the tails are well known. Once the desired enrichment level is reached, the product may be made into nuclear reactor fuel rods by the methods well known in the art.

What is claimed is:

1. A method of separating the isotopes of uranium, said method being applied to gaseous molecules of $UF_6$, and said method comprising subjecting said $UF_6$ to IR radiation at a predetermined wavelength or set of wavelengths under conditions such that at least 0.1% of either the $U^{235}F_6$ molecules or the $U^{238}F_6$ molecules absorb an energy of more than 2000 cm$^{-1}$, said excitation being done in less than $10^{-3}$ seconds, reacting said excited $UF_6$ with a gaseous reagent chosen from the group of atomic chlorine, bromine, and iodine, said reagent being present in at least 0.1 mole ratio to $UF_6$, and the contact time between the $UF_6$ and the said reagent being less than $10^{-3}$ seconds, and separating the reaction product from the unreacted $UF_6$.

2. The process of claim 1 wherein the gaseous reagent is atomic chlorine.

3. The process of claim 1 wherein the gaseous reagent is atomic bromine.

4. The process of claim 1 wherein the gaseous reagent is atomic iodine.

* * * * *